Patented Sept. 26, 1944

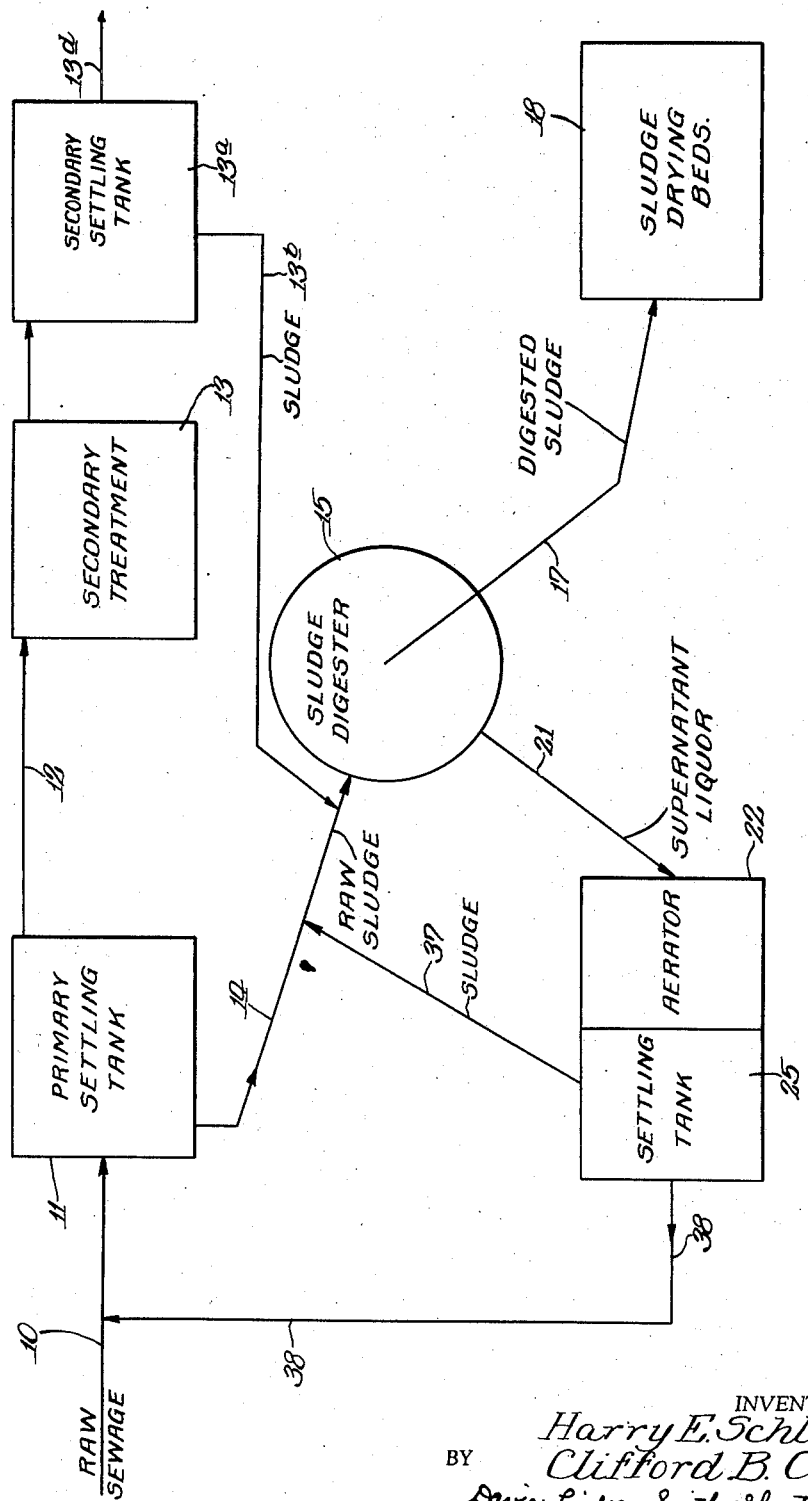

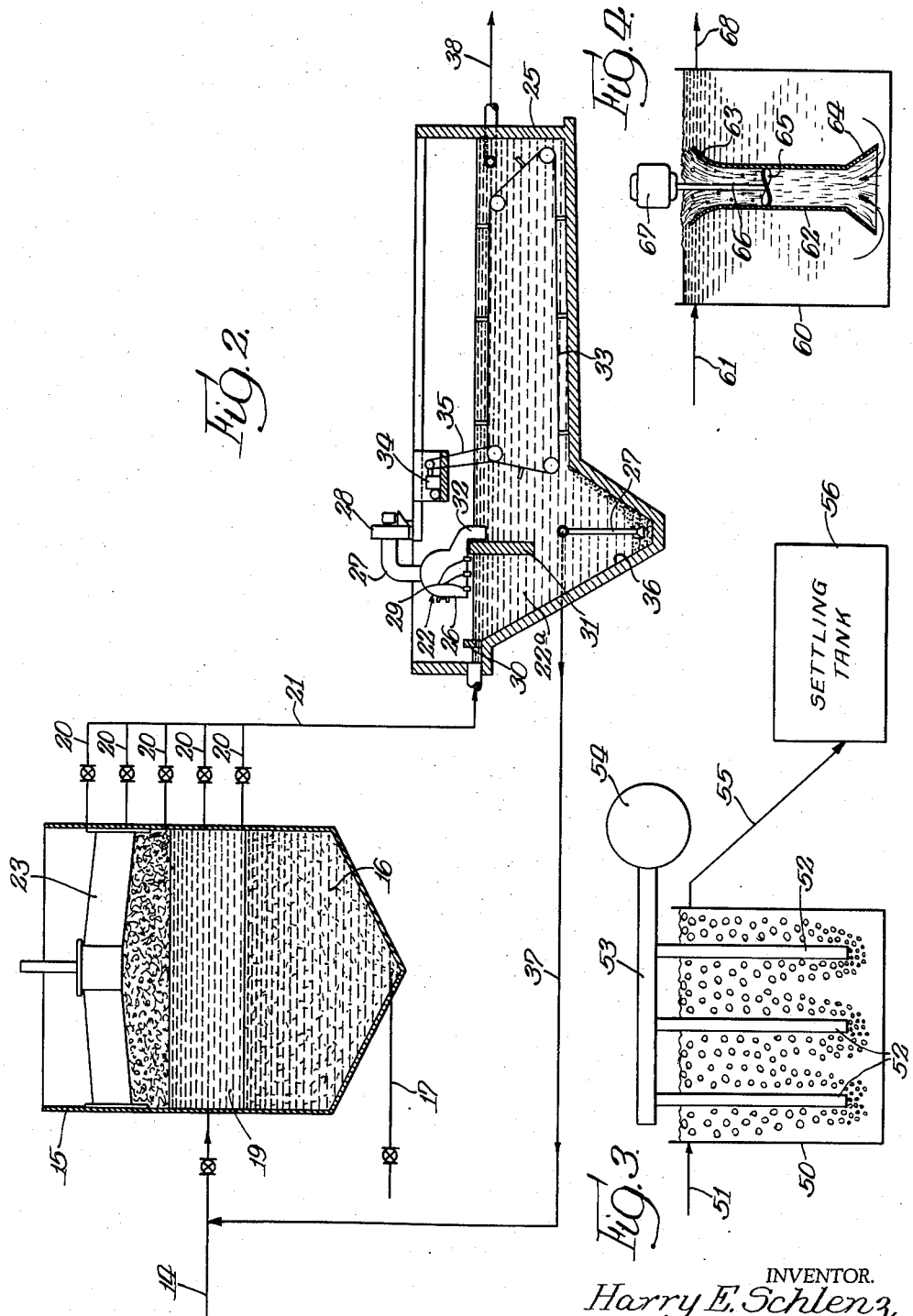

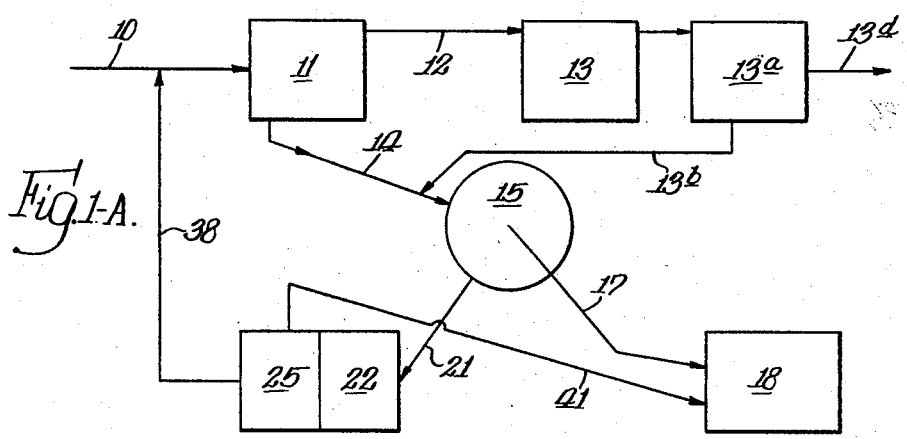
Fig. 1-A.
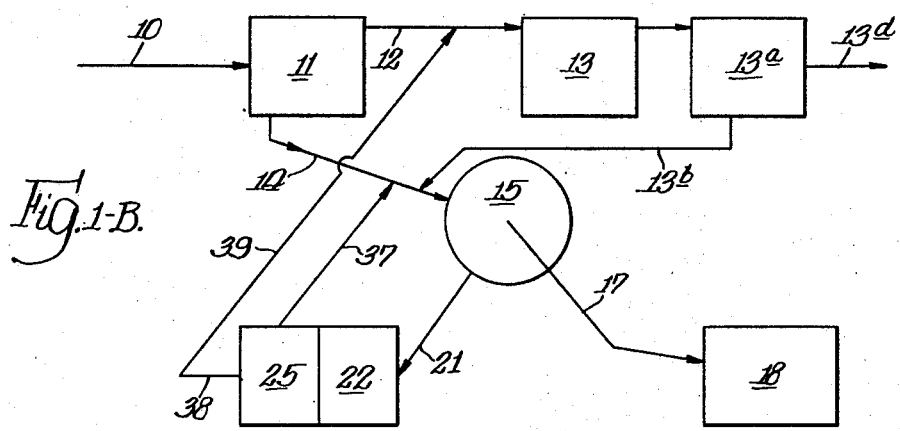
Fig. 1-B.
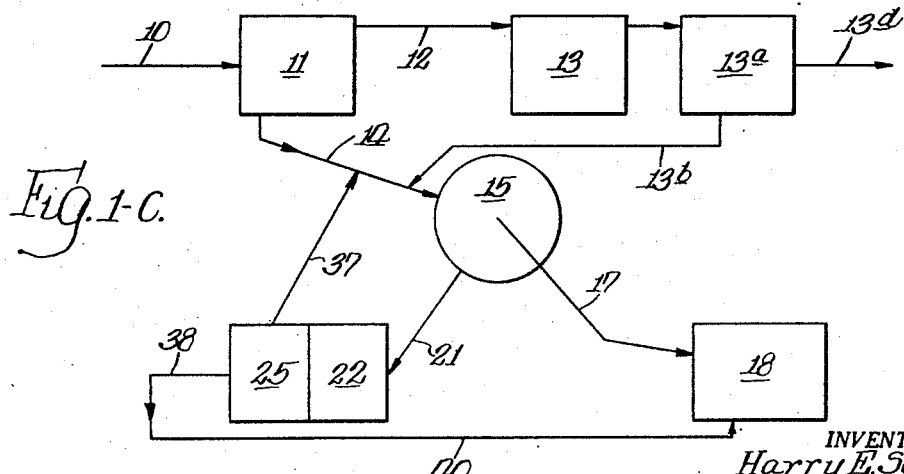
Fig. 1-C.

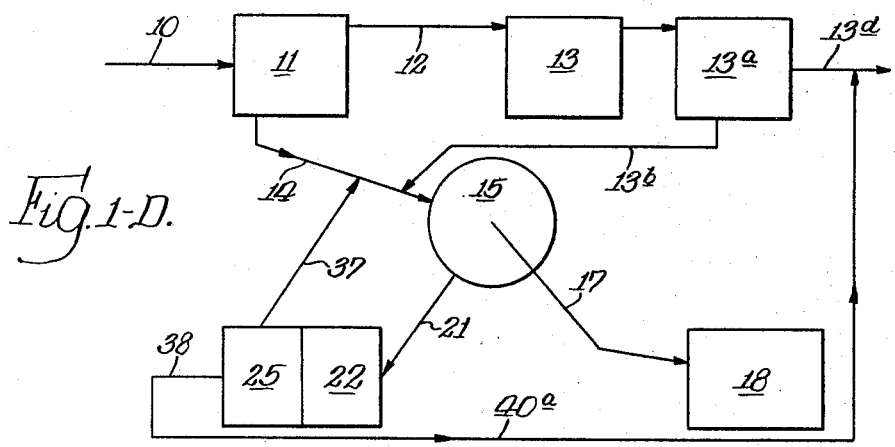
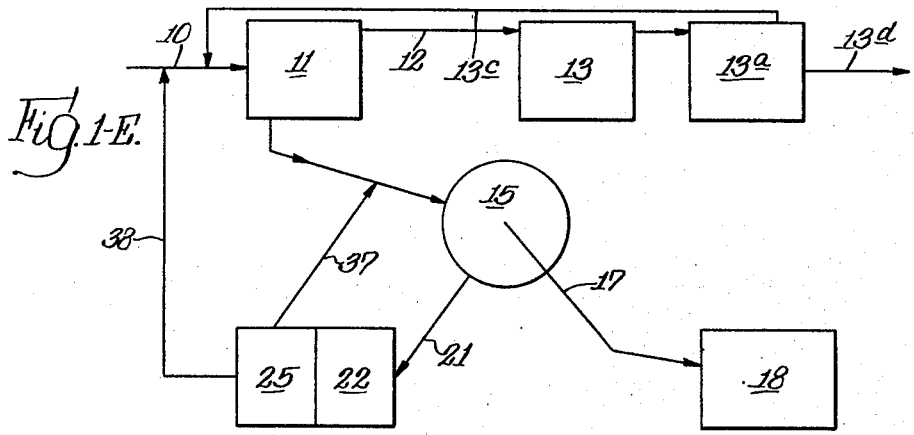
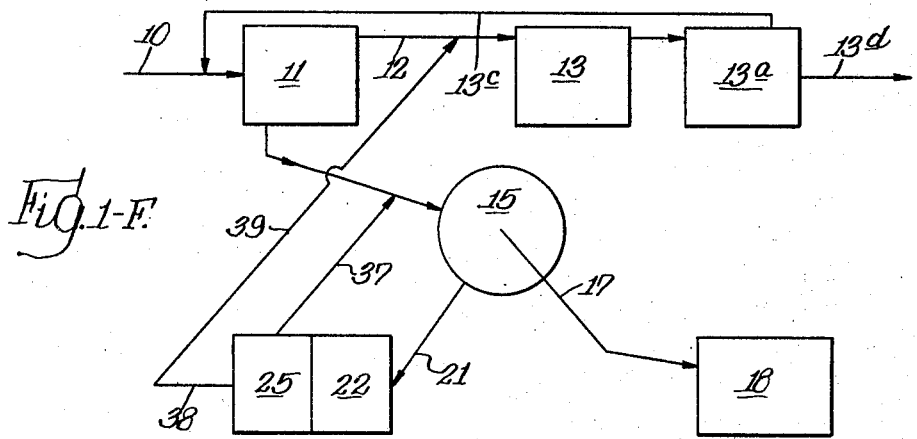

2,359,004

UNITED STATES PATENT OFFICE 2,359,004

METHOD OF TREATING SUPERNATANT LIQUOR

Harry E. Schlenz, Glencoe, and Clifford B. Cox, Chicago, Ill., assignors to Pacific Flush Tank Company, Chicago, Ill., a corporation of Illinois Application August 22, 1941, Serial No. 407,856

11 Claims. (Cl. 210—2)

This invention relates to the treatment of sewage material and it has to do more particularly with a method of treating the supernatant liquor formed in an anaerobic digester, whereby the supernatant liquor may be disposed of without upsetting the normal and desirable sewage treatment function of the entire plant.

In present day sewage treatment practice, it is customary for raw sewage and similar wastes to be subjected to an initial treatment in which it is passed through a primary settling tank wherein the settleable suspended solids are settled out and the liquid and non-settleable material therein are passed on for secondary treatment by the activated sludge or trickling filter or other processes. Following secondary treatment, the material is passed into a secondary settling tank wherein the settleable solids are settled out. The settled material or sludge then is usually taken from the primary settling tank and from the secondary settling tank following secondary treatment and placed in a sludge digestion tank in which the organic solids of the sludge are subjected to an anaerobic bacterial decomposition, the resulting digested sludge being then placed upon drying or open sludge beds for later disposal or it may be dried by other means, or incinerated. In the normal digestion operation approximately fifty per cent of the solids are converted to liquid and gas and since the digested sludge which is withdrawn has approximately the same or less moisture content as the raw sludge, a substantial amount of liquid or supernatant liquor, which separates in a horizontal layer or zone near the center or upper portion of the digester tank, must be drawn off periodically for disposal. This supernatant liquor, as withdrawn from the anaerobic digester, contains considerable quantities of suspended or colloidal matter, often in amounts of 5,000 to 20,000 parts per million of suspended solids, and has a very high oxygen demand, often in the range of 2,000 to 3,000 P. P. M. of B. O. D. (5 day bio-chemical oxygen demand). Although the digestion process embodying the function of anaerobic bacteria operates in the absence of oxygen, the supernatant liquor contains organisms and/or organic materials having great affinity for oxygen and this characteristic has been largely responsible for the difficult problem of its disposal.

Supernatant liquor contains a substantially heavy concentration of organic solids in suspension and in solution and colloidal form, this concentration at times approaching that of concentrated sludge and being more concentrated than raw sewage. Heretofore, it has been common practice to return this supernatant liquor from the digester to the raw sewage either before or after it reaches the primary settling tank. In such prior practice, because of the high oxygen demand of the supernatant liquor with its high concentration of organic solids, the supply of oxygen of the combined materials becomes depleted with the result that the normal function of the aerobic bacteria utilized in the secondary treatment processes of raw sewage is upset and plant operation rendered unsatisfactory.

For example, in the activated sludge process, the supernatant liquor may cause the contents of the primary settling tank to become septic and consequently the material drawn therefrom for secondary treatment into aeration tanks will have a toxic effect upon the aerobic bacteria which necessarily function in the activated sludge process. Such an effect results in a bulking of the solids in the aeration tanks and final settling tanks which in turn upsets the digestion tank, making the supernatant liquor more concentrated and thereby setting up a "vicious cycle" which results in upsetting the entire plant process, making it incapable of properly treating the sewage.

Also, with respect to the trickling filter type of secondary treatment, after the supernatant liquor has been combined with the raw sewage in the primary settling tank and the material has become septic, this septic material when discharged into the trickling filters, will upset or kill off the aerobic bacteria and other organisms dependent upon oxygen for their proper functions in the purification treatment process. Consequently, this secondary treatment process due to the inoperation of the necessary organisms would be brought to a standstill or would be so inefficient that the effluent discharged from the plant might be in worse condition than the raw sewage admitted to the plant.

Although the undesirable effects of untreated supernatant liquor as it is returned to the treatment process has long been recognized in each of the above types of plants, no satisfactory solution has heretofore been found. Numerous attempts to find a remedy have failed or have been found to be impractical. Remedial attempts by the addition of chemicals to the supernatant liquor in order to achieve some degree of purification have not solved the problem. In treatment plants where the problem is encountered continuously, the supernatant liquor has, at times, been discharged onto sand drying beds instead of returning it to the raw sewage. While this latter means successfully disposes of the supernatant liquor, the excessive expense arising from the high initial cost of the sand bed and from the fact that the sand bed has a relatively short operative life due to the tendency of the supernatant liquor to clog up the sand, renders its use impractical for most plants. This sand bed method of disposal of supernatant liquor is also undesirable in that it creates an odor nuisance. Similarly, attempts have been made to settle the supernatant liquor in separate tanks but this method of treatment has also proved futile since the large proportion of solids in the supernatant liquor are in colloidal form and would, therefore, not settle out. Furthermore, considerable quantities of gases remain entrained in the liquor with the other solids, thereby preventing these solids from settling out.

The principal object of our invention is to provide an improved, simple and inexpensive method of treating supernatant liquor, which may be practiced as a continuous process or by the fill and draw method, whereby the difficulties heretofore experienced in the handling of the supernatant liquor are overcome. To that end, the supernatant liquor is discharged directly from the anaerobic digester and is subjected to violent aeration and agitation treatment followed by a period of quiescent settling whereby the B. O. D. and the suspended and colloidal solids are reduced to substantially the same proportions as they appear in normal raw sewage in which the five day B. O. D. may amount only to 200 to 250 P. P. M. and the suspended and colloidal solids 150 to 200 P. P. M. The violent aeration and agitation treatment serves to reduce the otherwise non-settleable colloidal structure of the material to settleable form. In such treatment the entrained gases in the supernatant liquor are released and the greater proportion of the non-settleable materials having a very high oxygen demand may be settled out during the period of quiescence in a settling chamber. These settled materials may be withdrawn from the settling chamber as concentrated solids and returned to the digestion tank, and the liquid (having substantially no greater oxygen demand than raw sewage) from which the greater proportion of the solid materials have been separated may be returned to the raw sewage without causing any detrimental or upsetting effect in the secondary treatment processes.

Another object of our invention is to provide an improved treatment of sewage material which includes the method of handling the supernatant liquor formed in an anaerobic digester in such a way that it may be returned to the raw sewage without upsetting the normal secondary treatment function of the sewage plant.

Other objects are to provide an improved treatment for supernatant liquor whereby the suspended and colloidal solids and the high oxygen demand of the liquor are reduced to substantially the same proportions occurring in raw sewage; to provide an improved process for the treatment of supernatant liquor wherein the supernatant liquor is withdrawn from the digester and subjected to a violent agitation and aeration action to free the entrained gases and break up the colloidal structure, this action being followed by a period of quiescent settling; and to provide an improved process of sewage treatment by which the supernatant liquor of a sludge digester is subjected to agitation and aeration followed by a period of quiescent settling, and the settled solids of the liquor are returned to the digester for further treatment and the relatively clarified liquor is returned to raw sewage for further treatment.

Other objects and advantages will become apparent from the following description taken in connection with accompanying drawings, wherein Figure 1 is a flow diagram illustrating one system for carrying out our invention;

Figs. 1—A, 1—B, 1—C, 1—D, 1—E and 1—F are flow diagrams illustrating modified systems for carrying out our invention;

Fig. 2 is a diagrammatic vertical section view of one form of digester tank and a combined aerator and settling chamber, diagrammatically illustrated in Fig. 1;

Fig. 3 is a vertical sectional view, partially diagrammatic, illustrating another form of aerator and settling chamber that may be employed in carrying out our invention; and Fig. 4 is a vertical section view, partially diagrammatic, illustrating still another form of aerator that may be employed in carrying out our invention.

Referring particularly to the flow diagram of Fig. 1, the raw sewage material is received at the plant from its source and is passed through a suitable conduit means 10 to a primary settling tank 11 for primary treatment. In this primary settling tank 11 the suspended settleable solids are settled out and the effluent is passed through conduit means 12 to a secondary treatment zone 13 of the plant in which the effluent is treated by the activated sludge process or by the usual thickling filter, or any other known secondary treatment process. Following secondary treatment the effluent is then passed into a secondary settling tank 13ª wherein the settleable solids are settled out and the effluent is discharged to a desired point of disposal through discharge conduit 13ᵈ.

The settled solids or sludge from the primary settling tank 11 is passed through conduit means 14 to a sludge digestion tank 15. The settled solids or sludge from the secondary settling tank 13ª may also be passed through conduit means 13ᵇ to the digester 15 (Figs. 1, 1—A, 1—B, 1—C and 1—D); but, at times, it may be returned to the primary settling tank 11 through conduit means 13ᶜ as shown in Figs. 1—E and 1—F where it becomes mixed with raw sewage and is settled out with the solids of the raw sewage and thus is eventually passed into the digester 15 along with the raw sludge. In the digester 15, the sludge undergoes the usual anaerobic bacterial decomposition. The digested solids, indicated at 16 (Fig. 2), are deposited at the bottom portion of the digester 15 and are discharged from that point through conduit means 17 to the usual sludge drying beds 18 or other means for later disposal.

In carrying out our invention, the supernatant liquor 19 (Fig. 2) which forms in a horizontal zone near the center or upper portion of the digester 15 is drawn off through a plurality of draw-off conduits 20 which are connected to a common conduit means 21 through which the supernatant liquor is passed to an aerator or agitator 22. The draw-off conduits 20 are positioned at various levels along the upper portion of the digester 15 in order to insure proper withdrawal of the supernatant liquor as its depth varies due to varying characteristics of the sludge in the digester at different periods of operation. The digester 15 as shown is provided with a well-known form of floating cover 23 for the usual purpose which will not be discussed here but it is to be understood that other digester means may be used without departing from our invention.

Referring to Fig. 2 of the drawings, the aerator or agitator 22 is combined with a settling chamber 25, the arrangement being such that the supernatant liquor is fed directly to the aerator where it is agitated and aerated and is then passed to the settling chamber where quiescent settling takes place. The aerator 22, which is shown somewhat diagrammatically is generally of the form shown in the copending Hawley application for United States Letters Patent, Serial No. 164,367, filed September 17, 1937 and issued May 5, 1942, under Patent No. 2,282,225. Briefly it comprises an aerating chamber 26 connected at its upper end by a conduit 27 leading to an exhaust fan or pump 28. A plurality of vertically disposed tuyères 29 are mounted in the floor of the chamber 26 which tuyères extend a short distance above the floor of the chamber 26. These tuyères also extending downwardly below the floor of such chamber to a point a short distance above the surface of the supernatant liquor in the aerator chamber 22ª. The distance between the lower ends of the tuyères and the liquor may be varied. We have found that good results may be obtained by locating the tuyères from ¼" to 1" above the material.

A transversely extending weir plate 30 may be provided at the intake end of the aerator chamber 22ª whereby the incoming supernatant liquor is delivered into the body of the material present in the aerator chamber 22ª with a minimum disturbance of the material in the surface thereof. The aerator chamber 22ª is provided with a baffle 31 which extends transversely and vertically to a depth sufficient to confine the untreated supernatant liquor in the aerator chamber in operative relation to the tuyères 29.

With the foregoing arrangement, the suction of the pump 28 draws air at a high rate through the tuyères 29, thereby lifting the liquor from the surface of the aerator chamber 22ª through the tuyères and into the aerating chamber 26. In this action the liquor is violently agitated and broken down into very fine particles which enable a high degree of aeration. In this form the liquor passes into the aerating chamber 26 where it is aerated, collected and finally delivered through a drain conduit 32 into the settling chamber 25 on the rear side of the baffle 31. In this aerating action, a large part of the gases entrained in the supernatant liquor are released therefrom, the colloidal material being broken down into settleable form so that when the material is delivered to the settling chamber 25 following the aeration thereof, such material will readily settle therein.

The settling chamber 25 may be provided with an endless conveyor 33 which is operated by a motor 34 through drive means 35. This conveyor 33 conveys the settled solids from the settling chamber 25 into a lower sludge collecting portion 36 of the combined aerator and settling tank.

Preferably, the settled solids or sludge collected in the sludge pocket or chamber 36 are returned through conduit means 37 to the digester 15 for further treatment. The conduit 37 (Figs. 1, 1—B, 1—C, 1—D, 1—E and 1—F) is, preferably, connected to the conduit 14 intermediate the digester 15 and the primary settling tank 11. Or, if desired, the sludge from the sludge chamber or pocket 36 may be passed directly to the sludge drying beds instead of being returned to the digester 15. In the latter case, the sludge may be discharged through a conduit 41 to the sludge beds 18, as shown in Fig. 1—A. The relatively clarified liquor is withdrawn at the upper portion of the rearward end of the settling chamber 25 and is, preferably, returned by suitable conduit means 38 (Figs. 1, 1—A and 1—E) to the intake 10 of the plant where it becomes mixed with the incoming raw sewage and passes into the primary settling tank for retreatment. Since the relatively high oxygen demand and the high percentage of suspended solids have, by the above described aeration and settling treatment, been reduced to the limits in which they appear in normal raw sewage, the treated supernatant liquor may be returned to the regular treatment plant without upsetting the normal function of the entire plant as pointed out hereinbefore.

If desired, the clarified and treated supernatant liquor may be discharged from the settling chamber 25 through conduit means 39 (Figs. 1—B and 1—F) to conduit means 12 instead of mixing it with the incoming raw sewage. In this case, the treated supernatant liquor becomes mixed with the effluent from the primary settling tank 11 and is passed on to the secondary treatment zone 13. Or, the liquor from the settling chamber 25 may be passed through conduit means 40 to the sludge drying beds 18 as shown in Fig. 1—C or directly to the discharge conduit 13ᵈ leading to a point of disposal, without further treatment as shown in Fig. 1—D.

It will be understood that while the form of agitating and aerating device shown in Fig. 2 will well serve the purpose of our invention, other forms of aerators, such as those illustrated in Figs. 3 and 4, may be employed with excellent results. Referring particularly to Fig. 3, the aerator there illustrated comprises a tank 50 into which the supernatant liquor 19 is delivered from the digester 15 through a conduit 51. A plurality of pipes 52, supported from a common conduit 53 which is connected to a blower or compressor 54, extend downwardly and terminate with their open ends or diffusion means adjacent the bottom of the tank 50. By the foregoing structure the air from the compressor 54 is forced through the pipes 52 near the bottom of the tank 50, thereby agitating and aerating the supernatant liquor therein. In this way, as in the form of Fig. 2, the colloidal structure of the solids is broken up and the entrained gases are freed. As a result, the solids of the liquor which is then discharged from the aerating tank 50 by conduit means 55 to a settling tank 56 are settled out and disposed of as described hereinabove. The treated liquor may also be handled as described herewithin.

The form of agitator and aerator illustrated in Fig. 4, comprises a tank 60 into which the supernatant liquor may be delivered from the digester by conduit means 61. The aerating mechanism of this form comprises a relatively large, tubular member 62 having flared or funnel-shaped mouths 63 and 64 at its top and bottom ends and arranged vertically within the tank at substantially its center. The member 62 is of such length that its lower flared end terminates a slight distance from the bottom of the tank 60 and its upper flared end is positioned near the surface of the liquor. A propeller 65 which is mounted on the end of a shaft 66 is disposed within the tubular member 62 intermediate its ends and is adapted to be driven by an electric motor 67 in such a manner that the supernatant liquor is drawn up from the bottom of the tank into the member 62 where it is violently agitated by the propeller 65 and then expelled at the top of the member 62. The direction of rotation of the propeller may be reversed with satisfactory results so that the supernatant liquor is drawn down into the cylinder 62 and expelled at the bottom of the tank after violent agitation. The liquor thereby agitated and aerated, is discharged through conduit means 68 into a settling tank (not shown) similar to the tank 56 of Fig. 3, after which the process is continued as described above in connection with the forms of Figs. 2 and 3. Other devices for agitating and aerating the supernatant liquor may be employed. For example, we may also employ an aerating tank provided with power driven paddle wheels disposed for rotation in either horizontal or vertical planes, the same being used with a separate settling tank and substituted for the combined aerator 22 and settling chamber 25 of Fig. 2.

Although control valves have not been shown in every instance in the drawings, it is to be understood that such valves for controlling the passage of the sewage materials through the various conduits from one zone to another through the treatment plant are necessarily a part of the aforedescribed apparatus employed in carrying out my improved process. Such control valves may take the form of any of the usual and well-known types.

In practicing the improved process embodying our invention, the fill and draw method may be employed with satisfactory results. For example, supernatant liquor from the digestion tank may be passed into a holding tank in which aeration means may be operated for a period necessary to produce the desired aeration of the liquid. The aerating means may then be shut off and the liquid allowed to stand quiescent for a period of time sufficiently long to allow settleable materials to drop to the lower portion of the tank. Such settled materials may then be returned to the digestion tank or some other desired point of disposal, the liquid portion being decanted off and disposed of or returned to the sewage treatment process in any of the manners heretofore mentioned.

We claim:

1. The method of treating supernatant liquor formed in a sludge digestion tank to which sludge produced by a treatment process has been passed for anaerobic bacterial decomposition which comprises the steps of aerating the liquor, then allowing the settleable solids of the liquor to settle during a period of quiescence, returning the settled solids of the aerated supernatant liquor to the digestion tank, and returning the remaining liquor to the treatment process.

2. The method of treating supernatant liquor formed in a sludge digestion tank to which sludge produced by a treatment plant has been passed for anaerobic bacterial decomposition which comprises the steps of aerating the liquor, segregating the aerated supernatant liquor and allowing the settleable solids of such liquor to settle during a period of quiescence, and then passing aerated supernatant liquor to a point where it is delivered to the treatment plant for further treatment with raw sewage.

3. The method of treating supernatant liquor of a sewage plant, which comprises passing supernatant liquor formed during anaerobic digestion of sewage material to a zone where it is subjected to agitation and aeration thereby liberating gases entrained therein and reducing nonsettleable colloidal matter thereof to a settleable condition, passing the aerated liquor to a quiescent settling zone wherein the settleable materials thereof are permitted to settle, passing the liquor effluent from said settling zone to a point where it is mixed with incoming raw sewage, and feeding the settled material from said settling zone to a point of sludge disposal.

4. The method of treating supernatant liquor formed in an anaerobic digestion zone from material fed to such zone from a settling zone, which comprises the steps of feeding the supernatant liquor from the digestion zone to a zone in which it is subjected to agitation and aeration, feeding the agitated and aerated liquor to a quiescent settling zone, passing the liquor effluent from the quiescent settling zone to a point where it becomes a part of material passing to said first mentioned settling zone, and passing the sludge settled from said aerated supernatant liquor from said quiescent settling zone to a point of sludge disposal.

5. The method of treating supernatant liquor formed in an anaerobic digestion zone from material fed to such zone from primary and secondary settling zones, which comprises the steps of feeding the supernatant liquor from the digestion zone to a zone in which it is subjected to agitation and aeration, feeding the agitated and aerated liquor to a quiescent settling zone, passing the liquor effluent from the quiescent settling zone to a point where it becomes a part of sewage material being delivered to said settling zones, and passing the sludge from said quiescent settling zone to a point of sludge disposal.

6. The method of treating supernatant liquor formed in a sewage treatment plant having a primary settling zone, an anaerobic digestion zone and a secondary treatment zone including a secondary settling zone, which comprises the steps of feeding settled material from said primary and secondary treatment zones to the digestion zone, feeding the supernatant liquor formed in the digestion zone to a zone wherein it is agitated and aerated, feeding the agitated and aerated liquor to a zone of quiescent settling wherein the settleable solids are permitted to settle, and finally passing the liquor effluent from said quiescent settling zone to a point from which it is passed to one of said settling zones along with other sewage material to be treated.

7. The method of treating sewage or other waste material which comprises the steps of settling the settleable solids of undigested sewage material, passing said settled solids to a digestion tank for treatment, subjecting the supernatant liquor formed in the digestion tank by the digestion process to the action of an aerator, then settling the settleable solids of the aerated liquor, and returning the settling-treated supernatant liquor from the latter point of settling to a point where it is subjected to retreatment with untreated sewage material.

8. The method of treating sewage or other waste material which comprises the steps of settling the settleable solids of raw sewage and the settleable solids of material which has been subjected to a secondary treatment, passing said settled solids to a digestion tank for treatment, subjecting the supernatant liquor formed in the digestion tank by the digestion process to the action of an aerator, then settling the settleable solids of the aerated liquor, and returning the relatively clarified settling-treated supernatant liquor from the latter point of settling to a point where it is subjected to re-treatment with untreated sewage.

9. The method of treating sewage or other waste material which comprises the steps of primarily settling the settleable solids of raw sewage, then passing the clarified liquid for secondary treatment including secondary settling, passing the settled solids to a digestion tank for treatment, passing the digested solids from the digestion tank to sludge drying beds, subjecting supernatant liquor formed in the digestion tank to an agitating and aerating action, then settling the settleable solids of the aerated and agitated supernatant liquor, next returning the settled solids of the agitated and aerated liquor to a point of disposal, and returning the agitated and aerated supernatant liquor effluent to the treatment plant ahead of the secondary treatment.

10. The method of treating sewage or other waste material which comprises the steps of primarily settling the settleable solids of raw sewage, removing the relatively clarified liquid for secondary treatment including settling, passing all the settled solids to a digestion tank for digestion treatment, subjecting the liquor formed in the digestion tank by the digestion action to the action of an aerator, then settling the settleable solids of the aerated liquor, returning the settled solids of the aerated liquor to the digestion tank, and returning the effluent of the aerated settling-treated liquor to a point where it becomes part of the untreated sewage material.

11. The method of treating sewage or other waste material which comprises the steps of settling the settleable solids of raw sewage in a primary settling zone, passing the effluent from said primary settling zone to a secondary treatment zone, passing the effluent from said secondary treatment zone to a secondary settling zone, passing the settled solids from said primary and secondary settling zones to a digestion zone, subjecting supernatant liquor formed in the digestion zone to the action of an aerator, passing the aerated supernatant liquor to a zone of quiescent settling where the settleable solids are settled out, passing the settled solids of the aerated liquor to a point of disposal and passing the settling-treated aerated supernatant liquor effluent from said quiescent settling zone to a prior zone for mixture with raw sewage for further treatment.

HARRY E. SCHLENZ.
CLIFFORD B. COX.